May 7, 1968  J. J. HORAN  3,381,996
AUTOMOBILE ROOF CONSTRUCTION
Filed Dec. 27, 1966  5 Sheets-Sheet 1

May 7, 1968   J. J. HORAN   3,381,996
AUTOMOBILE ROOF CONSTRUCTION
Filed Dec. 27, 1966   5 Sheets-Sheet 2

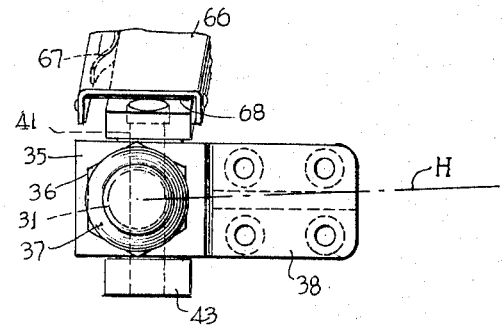
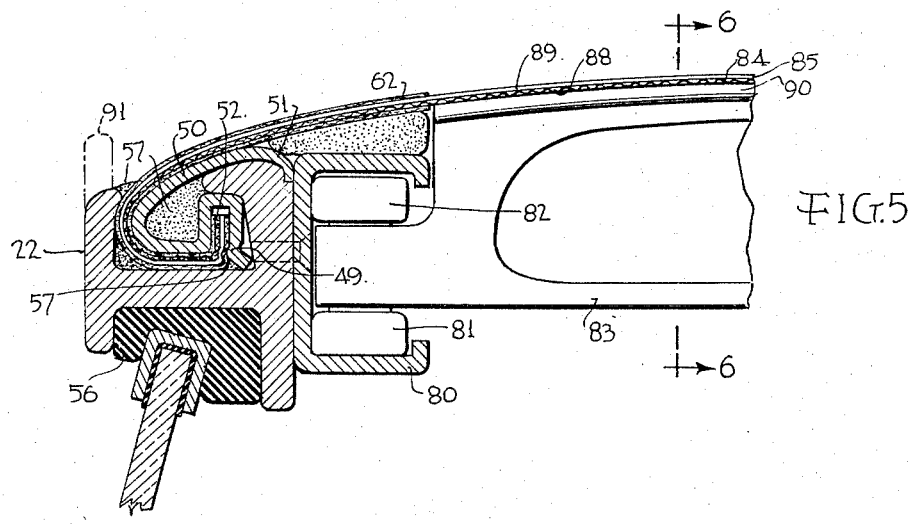
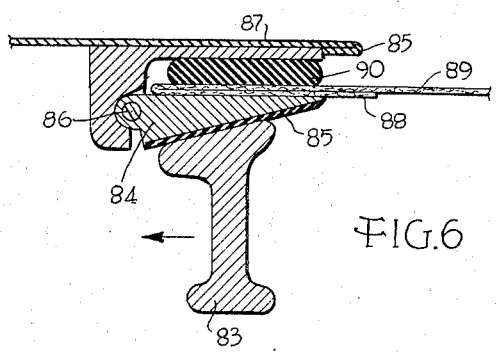

May 7, 1968 J. J. HORAN 3,381,996
AUTOMOBILE ROOF CONSTRUCTION
Filed Dec. 27, 1966 5 Sheets-Sheet 4
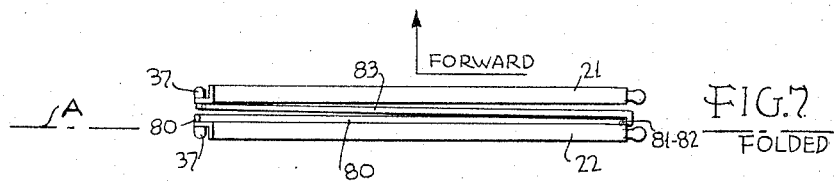
FIG.7 FOLDED
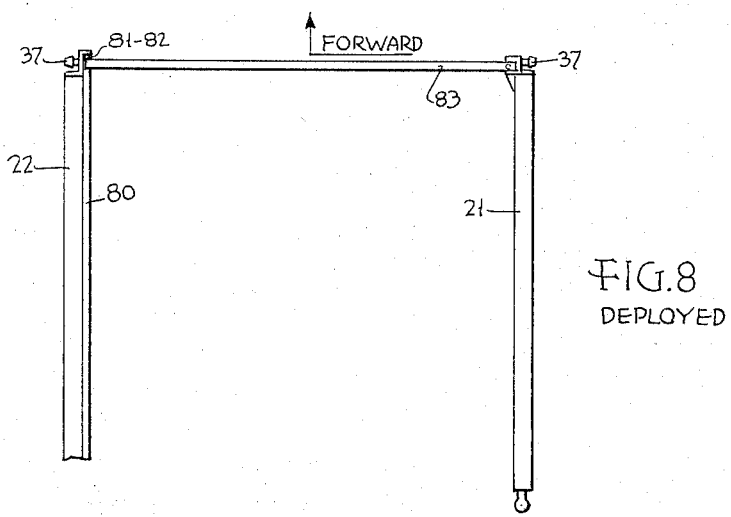
FIG.8 DEPLOYED
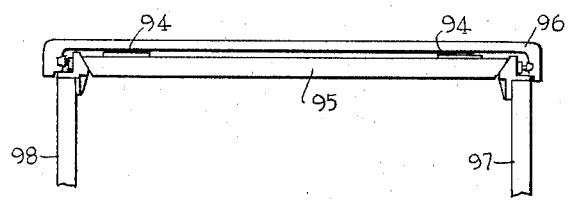
FIG.9
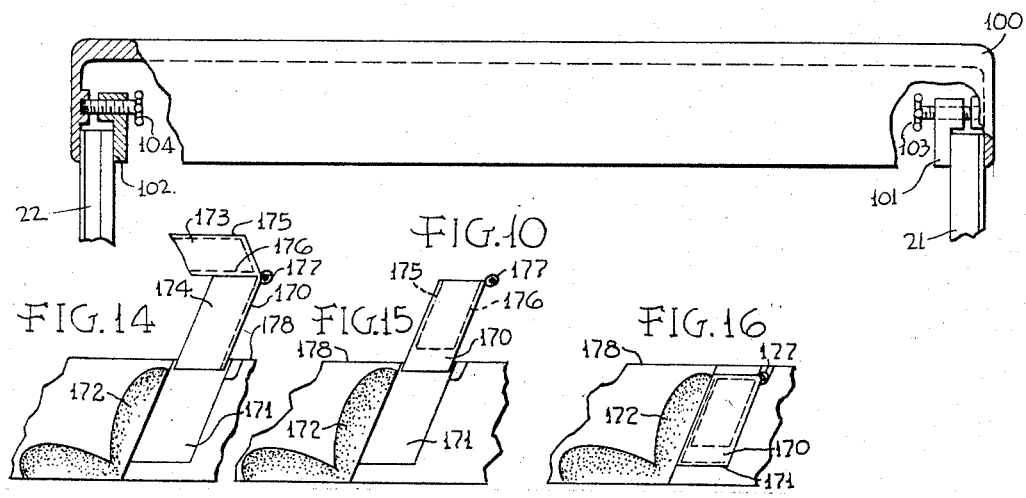
FIG.10
FIG.14 FIG.15 FIG.16

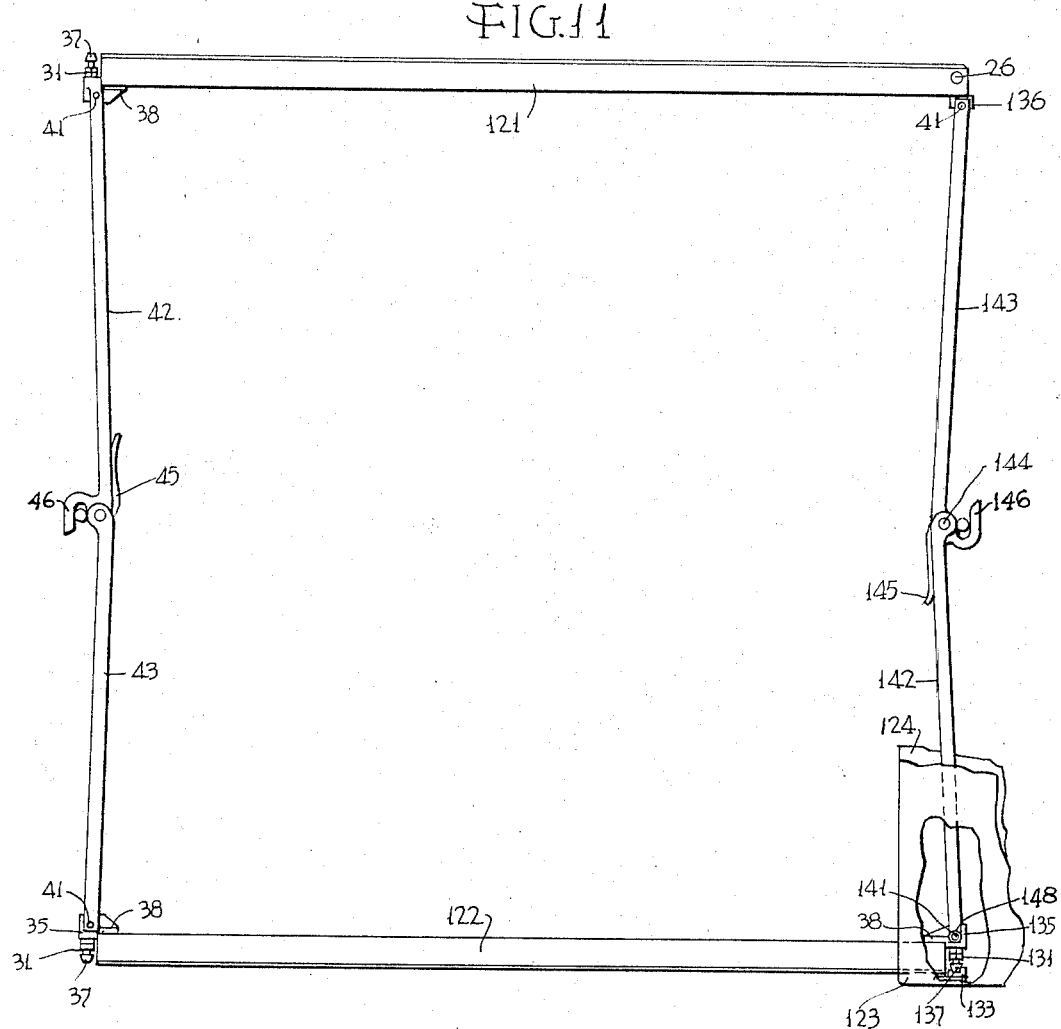
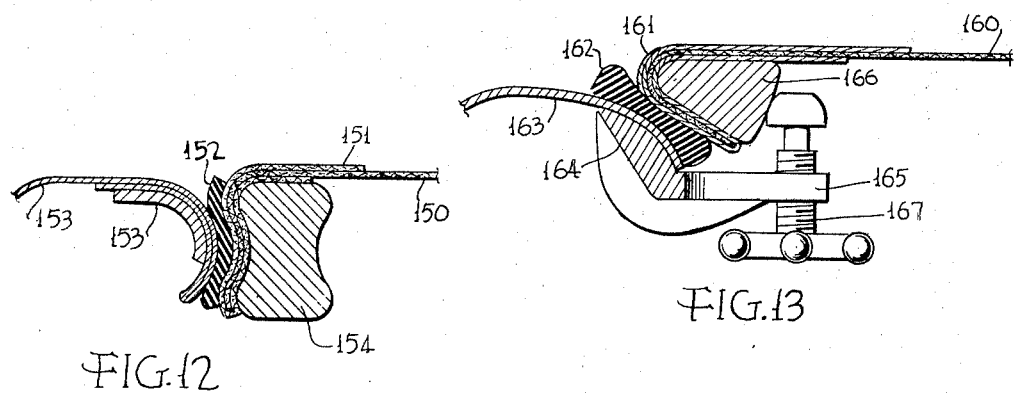

United States Patent Office 3,381,996
Patented May 7, 1968

3,381,996
AUTOMOBILE ROOF CONSTRUCTION
John J. Horan, 420 Quigley Ave.,
Willow Grove, Pa. 19090
Filed Dec. 27, 1966, Ser. No. 604,887
19 Claims. (Cl. 296—107)

This invention relates to bodies for passenger automobiles and particularly to those having a fabric roof adapted to be collapsed and stowed in pleasant weather. This invention abandons the traditional parallel-bow construction that has characterized the overwhelming majority of folding-roofed vehicles from baby buggies to wagons to roadsters and touring cars and including today's convertibles. It pioneers a new, stronger and simpler structure and a unique scheme for stowage of such a structure.

An object of this invention is to disclose a new and economical method of folding and stowing a collapsible roof structure for passenger vehicles in a very compact manner that renders the folded roof much less conspicuous.

An object of this invention is to disclose a roof structure that may be most easily and quickly collapsed and erected without enforcing a requirement for power assists.

An object of this invention is to disclose a kind of roof structure that does not employ the multiple parallel bows that give such roofs a characteristically bumpy, multi-cornered appearance.

An object of this invention is to disclose a smooth-appearing kind of folding roof structure for automobiles that has an inherently high degree of rigidity and freedom from joint rattling and has superior control over ballooning of the fabric when the vehicle is traveling at high speed.

An object of this invention is to improve the safety of open-style automobiles by providing them with a "roll bar" type of raised structure at the aft end of the passenger compartment.

Other objects and novel features of this invention are disclosed in the balance of the specification, in the claims, and in the drawings, in which:

FIG. 4 is a fragmentary elevation perpendicular to FIGS. 2 and 3, less the rail;

FIG. 5 is a fragmentary cross section of an alternative strut construction;

FIG. 6 is a fragmentary section at 90° to FIG. 5 of a roof sealing arrangement;

FIG. 7 is a schematic layout of the structure of FIG. 5 in a stowed position;

FIG. 8 is a schematic layout of the same structure as deployed;

FIG. 9 is a schematic layout of a variation of the structure seen in FIG. 8;

FIG. 10 shows the forward end of a folding structure employing no struts;

FIG. 11 is a layout of another alternative folding roof structure;

FIG. 12 is a fragmentary cross section of an alternative canopy seal;

FIG. 13 is a fragmentary view of another form of canopy seal;

FIG. 14 is a schematic view of a folding frame in the erected position;

FIG. 15 is a view of the same frame in the folded position;

FIG. 16 is a view of the frame of FIGS. 14 and 15 stowed behind a seat.

Figure 1:
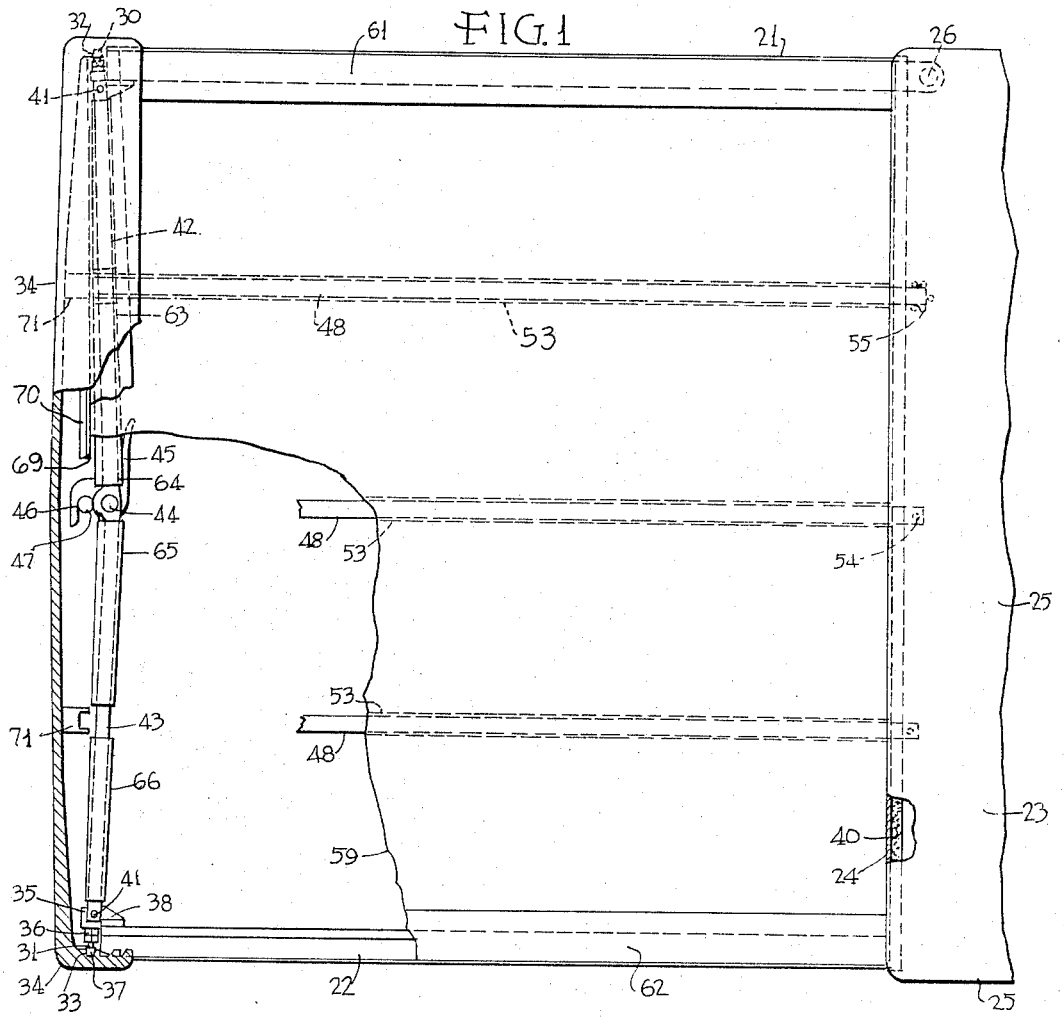
FIG. 1 is a partly cut away plan of a roof structure of this invention.
Figure 1A:
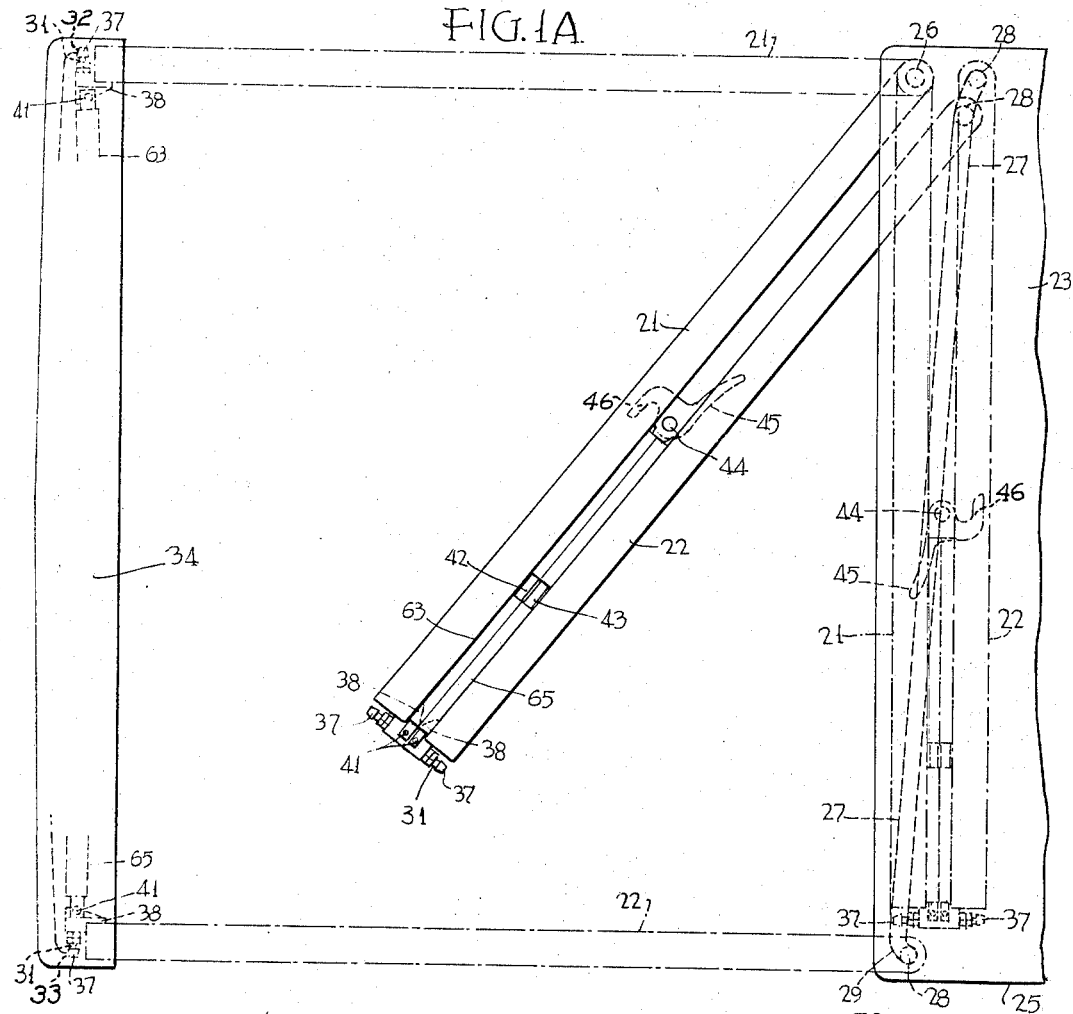
FIG. 1A is a plan showing the manner of stowing and deploying the canopy.

Referring now to FIGS. 1 through 4, the geometry of the roof structure is shown as deployed in FIG. 1, while FIG. 1A shows the principal structural members in both the stowed and half-deployed positions. The folding portion or canopy is supported at opposite longitudinal ends by windshield frame 34 and aft frame 25, which carries the canopy in the stowed position.

When stowed, side rail members 21, 22 preferably lie side by side above a short hidden shelf or partition 24 under the upper lip 23 of aft frame 25, which constitutes the upper rear quarter of the passenger compartment of an automobile. Frame 25 is preferably a sheet metal or fiberglass form having a rear window, an overhanging lip 23 and short sides, like a shallow box standing on one edge. This frame 25 may be structurally integrated as a part of the body itself; or it may be retractable into a lower position, perhaps behind a seat, flush with the rear deck. Partition 24 is adapted, together with cooperating roof or lip portion 23, to receive side rails therebetween and to afford them guidance during their deployment and support thereafter. Guidance and support of rails 21 and 22 may be derived from lip 23, shelf or partition 24, or both parts of frame 25. The guidance means may assume any of a choice of configurations. The principal guidance and retention means for one rail 21 may be a pivot pin 26 or functional equivalent anchored in frame 25, that allows right-hand rail 21 simply to rotate in a generally horizontal plane from the transverse or stowed position via the unfolding scheme shown to the fully deployed position of FIG. 1. Instead of the right-hand rail member 21, left-hand member 22 might have been pivoted. But, if both rails 21 and 22 were merely to swing about pivots, they would cross over during folding, wrinkling and bunching the fabric 59 so as to interfere with its stowage and deployment, mar its appearance and shorten its life. Both rails are stowed in parallel transverse positions. Therefore, one rail 22 will have a more complex motion.

While side rail 21 is rotating from the stowed position, side rail 22 preferably remains generally parallel to it until both rails have rotated nearly 90°. Then it is easy to displace the aft end of rail 22 all the way to the left side of the vehicle in a generally fore-aft alignment. Guidance means such as pin 28 may be provided for the aft end of side rail 22; and various alternative means for providing guidance surfaces to accommodate pin 28 or rail 22 directly will occur to those skilled in the art after this disclosure. Track 27, adapted to carry and guide pin 28, illustrates one means for guidance of the aft end of rail 22. Tracks can be fitted on the undersurface of lip 23 or on an upper surface of partition 24 or both.

The hooked left-end portion 29 of track 27 prevents pin 28 from returning to the right side after rail 22 is fully deployed with it forward end coupled to the windshield frame 34. The forward ends of rails 21, 22 are coupled by the ends of twin outwardly extending locating pins 30, 31 into fixed forward structure via pockets 32, 33 located under the lip of windshield frame 34.

Figure 3:
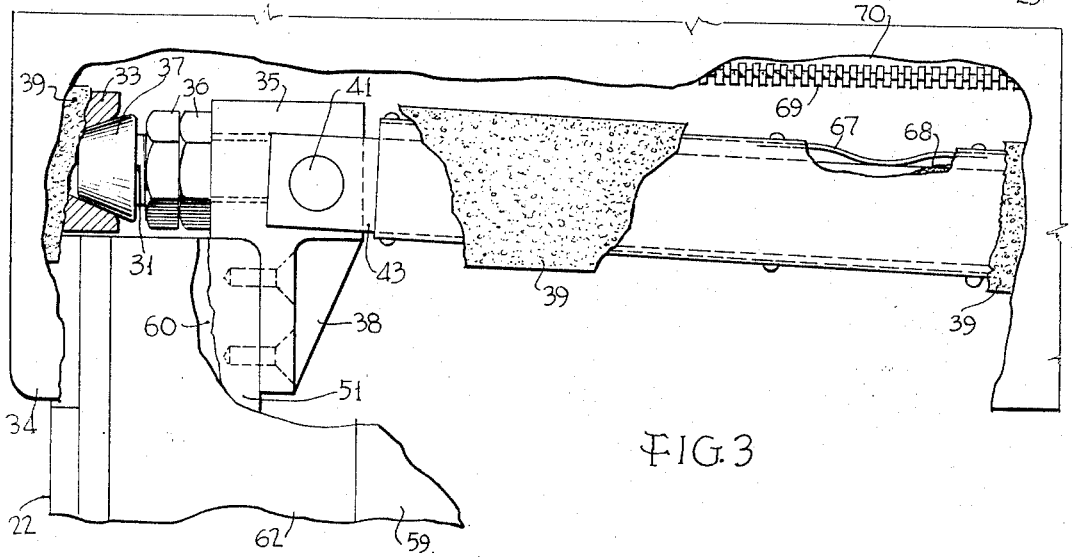
FIG. 3 is a cut away fragmentary view of a corner connection of the roof of FIG. 1.

Locating pin 31 is shown in detail in FIGS. 3 and 4. It has an elastomer coated head 37. It is threaded adjustably into end fitting 35 attached to side rail member 22, it being securely held there by locknuts or jam nuts 36. The leg 38 of end fitting 35 is secured by screws or other suitable means to the inboard side of the forward end of side rail 22. For weather sealing, and to provide improved sound and vibration damping, a non-flowing semi-hardening paste 57 may be used to seal clearance spaces between rails 21, 22 and the roof fabric 59, which is attached to the rails to form the canopy. Soft gasket 56 serves as a rest and weatherstrip for abutting door windows and other glass, when used. Hinge pin 41 affords a means for linking the forward end of side rail 22 with strut 43, which folds into a compact pair with strut 42 during stowage, as seen in FIG. 1A. Strut 42 swings about a similar hinge pin 41 that links it to rail 21. When strut assembly 42, 43 unfolds from stowed condition, it spreads rails 21, 22 apart and thus forcibly engages pins 30, 31 into pockets 32, 33, respectively, in windshield frame 34. The longitudinal motion at joint pin 44 is very great as the spreading operation approaches completion, while the transverse or outward motion of pins 31 towards the pockets 32, 33 in windshield frame 34 keeps diminishing in ratio thereto, thus yielding maximum mechanical advantage and applying maximum lateral force upon these wedge-headed pins 30, 31. The motion at the middle has a sin/cos relationship to the motion at the ends and the force ratios are reciprocal. The strong locking force thus developed adds greatly to the rigidity achievable with this structure. It prevents the rattling characteristics of old-style multiple-bow convertible roofs. This tightening action remains effective even when the car grows older, because the entry of adjustable pins or wedges 30, 31 into pockets 32, 33 causes the rails to pull the other members back into alignment longitudinally. Thus, the stiffness of rails or beams 21, 22 affords a truss-like structurally coupled reenforcement above the car body proper, in contrast to the structural ineffectiveness of the flimsy, rattling, parallel-bow structures populating the prior art.

Figure 2:
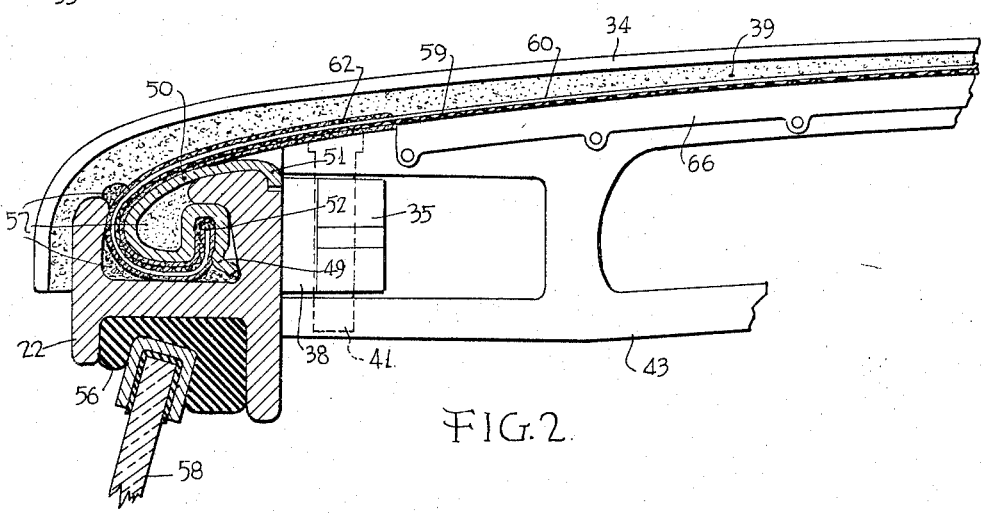
FIG. 2 is a fragmentary cross section of part of the folding roof of FIG. 1.

The roof fabric 59 may be secured and sealed at its aft end in any reasonable manner, such as the engagement of a zipper or other slide fastener to a full width tab secured to the underside of lip 23, or other means to be described in detail with respect to the forward end of the fabric and the windshield frame 34. The fabric 59 is permanently assembled to rails 21 and 22 on opposite sides in any suitable manner, such as that shown in FIG. 2. It is well to reenforce the fabric 59 with hems and/or doublers along zones of maximum stress and rubbing and at points of attachment, such as hem 60 across the forward edge and enwrapped doublers 61 and 62 along the sides. One lateral edge 52 of the doubled fabric is seen partly wrapped around and then squeezed by a fold 49 in mounting strap 50, which may be metallic. With the fabric 59 secured as shown, mounting strap 50 may be engaged as seen in FIG. 2, preferably aided by suitable adhesives, within the upper channel of rail 22, then wrapped over and around the upper inboard leg of rail member 22 and, while still held firmly in place, adhesively bonded or otherwise secured at its inboard end 51 to the contiguous surface of rail 22. Welding and soldering processes become applicable when appropriately compatible materials are employed. Side rails 22, 21 may have any of a wide choice of cross sectional configurations; and the juncture between fabric 59 and the side rail is also susceptible to a wide range of design variation.

Windshield frame 34 and aft frame 25, both of which are preferably lined with sponge rubber gaskets 39, 40, respectively, near the edges of their lip portions for sealing against fabric 59, have upper contours that define the slight crowning desired to be continued along the length of the fabric portion 59 of the deployed roof. Spaced longitudinal stiffeners 48, preferably bound by seams 53 into fabric 59, are fitted with suitable means for registry with pins, indentations or other locating aids contained in either the windshield frame 34 or lip 23 of rear frame 25, or in both, so as to maintain proper crowning and fore-to-aft stiffness throughout the length of fabric portion 59. Examples of such means are flanges 55 and holes 54. Other locating means may be incorporated, as at 71 in the windshield frame 34, in the lip of the rear frame 25, or in the struts 42, 43.

Both windshield frame 34 and aft frame 25 effectively constitute "roll bars" at opposite ends of the passenger compartment, which may help to protect seat-belted passengers in a roll-over type of accident.

Struts 42, 43 also may be crowned to match the curvature of the lip of the windshield frame 34. They may be slotted to clear stiffeners 48 in seams 53. The slots in this instance actually exist as discontinuities between thrust plate 63, 64, 65, and 66, which cap the transverse struts. The struts 42, 43 have a slight upward component to their forward locking motion. This component may derive, as can be noted from FIG. 4, from the tilt of end fittings 35 when they are assembled to the rails, which tilt causes hinge pins 41 at the remote ends of the struts also to be inclined to the horizontal H rather than perpendicular to it.

The thrust-plate segments 63, 64, 65, and 66 are slidably fitted upon the upper edges of struts 42, 43 and are forwardly biased by spring strips 67, as seen in FIGS. 3 and 4. As the struts are swung forwardly into deployment, the stiffeners 48 are forced upwardly against the hemmed forward end 69 of roof fabric 59. The thrust plates 63, 64, 65, and 66 are also carried progressively higher and are, therefore, forced upwardly against the hemmed fabric 59, 60. Friction between fabric 59, 60 and the thrust plates inhibits their forward motion, as the struts 42, 43 continue to be urged forward by the operator, who is exerting force upon junction pin 44 via locking handle 45 to engage hook portion 46 of the handle with pin 47, which last is secured to windshield frame 34. Handle 45 may be locked with a detent, pivoted bail, etc. Spring strips 67, which are trapped between the struts 42, 43 and the forward flanges of the thrust plates 63, 64, 65, and 66, yield as the struts continue forward toward locking position. A low-friction "Teflon" or similar coating such as 68 may be employed to facilitate wedging of the thrust plates upwardly by the struts. The thrust plates and the forward ends of the stiffeners 48 together force the roof fabric 59, 60 firmly against gasket 39 under the lip of the windshield frame 34, sealing out the weather. Gasket 40, lining the lip of aft frame 25, functions similarly.

Instead of or in addition to the sealing means thus described, both the forward and aft ends of fabric 59 may optionally be sealed with full width leakproof zippers 69 coupling them to tabs such as 70, which is preferably fixedly attached near the edge of windshield frame 34 parallel to gasket 39.

Referring now to FIGS. 5, 6, 7, and 8, the first shows a section looking forward along a similar left-side rail 22, this one having instead attached thereto a longitudinal track 80 for accommodating the movement therealong of rollers 81, 82 that are mounted, as an anti-friction rolling foot, upon the end of full-width tranverse strut 83. Strut 83, like strut 42 in the prior figures, is linked rotatably by a junction pin at the forward end of rail 21; but, unlike the prior embodiment, this one uses only a single strut 83 for spanning the full distance between rails 21 and 22. Forward movement of the left end of strut 83 jams side rail member 22 outwardly away from rail 21, as in the prior instance. Strut 83 may be locked in a forward position by means similar to that used in the prior instance, though the optimum location for hook 46 now shifts to the left.

Strut 83 moves forwardly, as urged by the operator, in the direction of the arrows in FIGS. 6, 7, and 8, to cam upwardly transverse wedge 84, pivotably 86 mounted within windshield frame 87, against hem 88 of roof fabric 89, which seals it compressively against gasket 90. The use of a low-friction layer 85, which may be a "Teflon" film, on the underside of wedge 84 helps to hold down to a minimum value the force necessary to deploy strut 83, and lock the roof in the deployed position. Raising the height of the outboard leg of the side rail along the major portion of its length between rear quarter 25 and windshield frame 34, as indicated by phantom outline 91, affords an integral rain gutter over the doors. This should not be done unless a high quality of waterproofing of the fabric in this area can be maintained.

By further inspection of FIG. 7, it will be readily seen that a canopy which has been folded with its structure aligned in the manner shown, being now a compact assembly, may be further conveniently displaced in any desired direction for stowage, such as downwardly into a receptacle behind the rear seat, or behind the single seat of a small sports car. It will, further, be seen that the compact assembly may also now be rotated in a second plane, as, for example, in a vertical plane about any chosen longitudinal axis as indicated (such axis now being transverse to the vehicle), in order to relegate the stowed canopy to the most suitable out-of-way position; optionally then, the frame may drop into the body. Referring now to FIG. 9, it is seen that a strut similar to the prior one need not necessarily be carried on the folding side rails of the canopy. A strut, such as 95, might be movably supported upon windshield frame 96 and forced via adustable fasteners in any preferred direction a very short distance into wedging engagement between rails 97 and 98, which in turn may be structurally coupled to the windshield frame as before. The direction of engagement motion of strut 95 with respect to rail members 97 and 98 is seen to be aft. A centrally hinged pair of struts, such as was seen in FIG. 1, might have been employed on the windshield frame in place of single-bar strut 95.

Referring now to FIG. 10, side rails 21 and 22 again appear, this time without any strut interconnection to force them apart against the interior of windshield frame 100. Instead, bolting brackets 101, 102 are secured to the ends of the rails and coarse-threaded, large-headed hand-clamping coupling screws 103, 104 are provided to fasten the rails into position via mating holes in windshield frame 100. Toggles, latches, or other fastening means, mounted either on the windshield frame or on the rails 121, 122, may be substituted for screws 103, 104.

In the prior figures, where inwardly stowed struts were deployed outwardly in a generally horizontal plane to meet end frame, the fabric 59 portion of the canopy would normally be folded for stowage above the structural side members. However, where these moving struts are absent, as in FIG. 10, it will be convenient to permit the fabric portion 59 to fall between the rails in stowage. Fabric so folded may then be secured to the underside of lip 23, concealing the structural members from view from the interior of the passenger compartment and making it unnecessary to provide a separate shelf or partition to screen the stowed structural members from view.

Referring now to FIG. 11, side rail members 121 and 122 may be generally similar to rails 21 and 22, seen previously, except for slight changes at their aft ends. The aft end of rail 122 is symmetrically related to the forward end; and at the aft end of rail 122, block 135 is mounted. End fitting 135 and block 136 serve to anchor an additional pair of struts 142, 143, joined 144, 145 in the same manner as struts 42, 43 were at the forward end, and capable of being attached to lip 123 of aft frame 125 by hook 145, 146 or other suitable fastener. Elastomer-coated head 137 tips bolt 131 for locating and coupling the aft end of side member 122 in pocket 133 in lip 123 in the same manner as the forward end is coupled.

In order to accommodate this multiple-strut construction, side members 122 should preferably exceed twice the length of struts as folded, so that strut joint 144, 145 will not interfere with joint 44, 45 when stowed. Alternatively, the curvature of the upper surface of frame 125 may differ from that of windshield frame 34 so that either the tilt or the height of fittings 135, 136 will differ from that of forward fittings to bring one of the joints below the other. Alternatively, the upper contours and cross sections of the aft struts may differ from those in front. To expedite prosecution I have refrained from lengthy discussion of details of varieties of locks, weights, and springs, including over-center types for facilitating deployment or stowage, since such equivalents are familiar to all designers.

The transverse track 27-29 of FIG. 1 is desirable when the canopy is heavy and covers a large area. Canopies in small single-seater sports cars may be so light that the track can be dispensed with, as in FIG. 11. However, if pin 141 is lengthened to extend above fitting 135, it may carry anti-friction roller 148 for facilitating movement of the aft end of side rail member 122 along a transverse track mounted on the underside of lip 123 of frame 125, or, if preferred, on the upper surface of shelf 124, which conceals the roof stowage position from view by the occupants of the vehicle. Because the coupling mechanism in FIG. 11 differs from that of FIG. 1, the track will not have the hooked contour at the left side that was seen in track 27, 29 of FIG. 1.

When a shelf 24 or under covering is relied on for partial support of a heavy canopy during deployment, the clearance between lip 23 and partition 24, which will be rigid in such event, will be held fairly closely; otherwise special precautions, such as extra support in the neighborhood of articulating support or pivot 26, may be necessary in order to prevent the front ends of side rails 21, 22 from drooping during deployment. There is no need for partition 24 to be in a horizontal plane; it may be inclined or may follow whatever roof contour the designer chooses. Particularly in the case of sports cars and other vehicles with passenger compartments of small area, the shelf 24 or under cover may be of fabric and thus foldable.

Referring now to FIG. 12, waterproof sheet midportion 150 is reenforced at a transverse edge by enwrapped doubler 151 and gasket 152 has been bonded to the outer surface of the latter for sealing against frame 153, of reenforced sheet-metal construction in the area of concern.

Transverse member 154 may be either a strut member or an intervening member forced to compress gasket 152 by the ends of a pair of deployed side rail members or by a strut located between them, or by all three. When a strut lies wholly between a pair of side members, the side members themselves usually seat against either the intervening member or against the gasket itself.

Referring now to FIG. 13, waterproof sheet midportion 160 is reenforced at a transverse edge by enwrapped doubler 161. Gasket 162 has been bonded to the edge of transverse frame 163, which is reenforced by continuous strip 164, having a series of integral projections 165. Transverse member 166 may be either a strut or an intervening member which is restrained against upward movement. Member 166 is cammed outwardly with respect to the passenger compartment by handwheel screws 167 mounted in projections 165, forcing sheet 160, 161 to seal against gasket 162.

Referring now to FIGS. 14 through 16, frame assembly 170 is movably mounted to slide downwardly into repository 171 behind the back seat 172 of an automobile. Any convenient power source may be employed, including manual, electrical, hydraulic, pneumatic, or even mechanically driven from some part of the power train of the automobile. The drive may utilize belt or chain, rack and pinion, pressure cylinder, etc., for elevating and lowering the frame.

Frame 170 consists of two parts, the upper 173 and the lower 174. The upper part 173 is hinged to the lower 174 so that, when the canopy has been stowed and secured between its upper 175 and lower 176 plates, the upper part 173 may then be rotated about hinge 177 to fall within lower part 174, after which the entire frame assembly 170 may be lowered to a position flush with or below deck level 178.

While the canopies of this invention have been shown to be supported in the aft frame for stowage, it will be obvious that they could have been stowed in and deployed from a forward or windshield frame having sufficient overhang above and aft of the glass, though such stowage would ordinarily be less desirable in an open vehicle.

Many combinations will become immediately obvious to those skilled in the art as a consequence of my disclosures herein, without departing from the true scope of this invention. It is, accordingly, intended to include in the appended claims such portions and equivalents as may fall within that scope. I wish it understood that my invention is not to be limited to the specific forms to which I have limited my descriptions, drawings, and claims for the sake of expeditious prosecution.

Therefore, I claim:
1. A roof structure for the passenger compartment of an automobile comprising:
   a canopy, including relatively rigid first and second longitudinally arrayed side members disposed above the respective first and second sides of the compartment and a foldable sheet midportion joining said members and spanning the transverse distance between them over said compartment;
   a pair of transverse frames projecting upwardly from respective mountings on the automobile at the ends of said compartment and forming opposite end supports for said canopy;
   coupling means for detachably securing one end of each of said side members to the upper portion of one of said frames;
   retaining means on the first side in the upper portion of the second frame for articulatably supporting the other end of the first side member; and
   coupling means for detachably securing the other end of the second side member to the second side in the upper portion of the second frame,
   whereby said canopy may be detached from said one frame, folded, and rotated in a generally horizontal plane to a transverse position for stowage on said second frame.
2. A roof structure as in claim 1,
said second frame including transverse track means for continuously supporting said other end of said second side member when said canopy is being so folded and rotated.
3. A roof structure as in claim 1,
said second frame including an auxiliary partition separating said canopy from the passenger compartment when said canopy is in stowage position.
4. A roof structure as in claim 1,
said side members each having a relatively soft longitudinal gasket joined thereto below the level of said midportion.
5. A roof structure as in claim 1,
said foldable sheet midportion having one of a pair of mating halves of a slide fastener attached along one transverse end thereof,
the other mating half being secured transversely of said compartment to the upper portion of a respective one of said frames,
whereby said midportion may be detachably coupled to said frame.
6. A roof structure as in claim 1,
said second frame being at the aft end of said passenger compartment,
said structure including also drive means for retracting said second frame containing said folded canopy downwardly within said automobile behind said compartment.
7. A roof structure as in claim 6,
said second frame comprising a lower portion and an upper portion joined thereto by latching means having an auxiliary compact position,
said upper portion being nestable at least in part with said lower portion for effecting said compact position.
8. A roof structure as in claim 1,
said structure including also movable means for tensioning said sheet midportion,
said means being aligned to apply transversely outward force against at least one of said side members.
9. A structure as in claim 8,
said means comprising a compression member aligned to be forcibly intervened between said side members.
10. A roof structure as in claim 9,
including at least one pivotable joint linking said compression member to a side member.
11. A roof structure as in claim 10,
said compression member including a foot at the end thereof opposite said joint,
said compression member being rotatable at approximately a right angle from a stowage position alongside said linked side member to a transverse position,
said foot jamming the other side member outwardly when in said transverse position.
12. A roof structure as in claim 9,
said compression member comprising two struts pivotably joined end to end.
13. A roof structure as in claim 12,
both of said struts having their remote ends pivotably joined to respective side members.
14. A roof structure as in claim 8,
having a second moveable tensioning means,
said second tensioning means being also aligned to apply transversely outward force against a side member,
said first and second tensioning means being disposed at opposite ends of said structure.
15. A roof structure as in claim 1,
one of said frames having a transverse seating surface thereon,
said sheet midportion having one end aligned with said seating surface,
said structure including also a gasket positioned in intervening sealing contact between said seating surface and said aligned end.
16. A roof structure as in claim 15,
said structure additionally including a moveably supported transverse member confining said one end of said sheet midportion and said gasket compressively against said seating surface.
17. A roof structure as in claim 16,
said transverse member having a rubbing surface,
said structure additionally including a second movably supported member,
said second movably supported member having a wedging surface in contact with said rubbing surface,
said second movably supported member having a direction of permissible motion,
at least one of said wedging surface and direction of motion being inclined with respect to said rubbing surface,
whereby movement of said movably supported member against said transverse member causes said transverse member to compress said gasket against said seating surface.
18. A structure as in claim 1, said structure including also at least one longitudinal stiffener assembled to said sheet midportion between and spaced apart from said side members, said stiffener forming a longitudinal bridge for supporting said sheet midportion against sagging between said frames and between said side members;

and guidance means cooperative with the opposite ends of said stiffener and said frames respectively for supporting said stiffener in longitudinal alignment therebetween.

19. A structure as in claim 18, having a plurality of said stiffeners spaced apart from and generally parallel to each other.

References Cited

UNITED STATES PATENTS

| | | | |
|---|---|---|---|
| 1,272,539 | 7/1918 | Saunders | 296—116 |
| 3,227,485 | 1/1966 | Geiger | 296—107 |

BENJAMIN HERSH, *Primary Examiner.*

R. SONG, *Assistant Examiner.*